United States Patent
Hwang et al.

(10) Patent No.: US 10,320,239 B2
(45) Date of Patent: Jun. 11, 2019

(54) WIRELESS POWER RECEIVER

(71) Applicant: MAPS, INC., Yongin-si (KR)

(72) Inventors: Jong Tae Hwang, Seoul (KR); Hyun Ick Shin, Seoul (KR); Min Jung Ko, Seoul (KR); Dong Su Lee, Dongducheon-si (KR); Jong Hoon Lee, Seongnam-si (KR); Ki-Woong Jin, Anyang-si (KR); Joon Rhee, Seoul (KR)

(73) Assignee: MAPS. INC., Yongin-si (KR)

( * ) Notice: Subject to any disclaimer, the term of this patent is extended or adjusted under 35 U.S.C. 154(b) by 55 days.

(21) Appl. No.: 15/558,302

(22) PCT Filed: Mar. 15, 2016

(86) PCT No.: PCT/KR2016/002560
§ 371 (c)(1),
(2) Date: Sep. 14, 2017

(87) PCT Pub. No.: WO2016/148481
PCT Pub. Date: Sep. 22, 2016

(65) Prior Publication Data
US 2018/0062445 A1    Mar. 1, 2018

(30) Foreign Application Priority Data
Mar. 18, 2015    (KR) .................. 10-2015-0037661

(51) Int. Cl.
*H02J 50/12*    (2016.01)
*H02M 7/06*    (2006.01)
(Continued)

(52) U.S. Cl.
CPC .............. *H02J 50/12* (2016.02); *H02J 7/025* (2013.01); *H02M 7/06* (2013.01); *H02M 7/217* (2013.01); *Y02B 70/1441* (2013.01)

(58) Field of Classification Search
CPC ........ H02J 7/025; H02J 50/12; Y02B 70/1441
(Continued)

(56) References Cited

U.S. PATENT DOCUMENTS

| 8,374,545 B2 | 2/2013 | Menegoli et al. |
| 9,369,058 B2 | 6/2016 | Boys et al. |

(Continued)

FOREIGN PATENT DOCUMENTS

| JP | 2015-29404 A | 2/2015 |
| KR | 10-2012-0073236 A | 7/2012 |

(Continued)

OTHER PUBLICATIONS

International Search Report dated Jun. 15, 2016 in corresponding International Patent Application No. PCT/KR2016/002560 (2 pages in English and 3 pages in Korean).

*Primary Examiner* — William Hernandez
(74) *Attorney, Agent, or Firm* — NSIP Law

(57) ABSTRACT

A wireless power receiver is disclosed. The wireless power receiver comprises: a resonance tank for receiving magnetic resonance-type wireless power; a rectifier including a diode bridge and a first switch connected to both ends of any one diode for forming the diode bridge, so as to rectify wireless power received by the resonance tank and supply the rectified wireless power to a load; and a controller controlling the first switch so as to operate the rectifier as a full-wave rectifier or a half-wave rectifier.

4 Claims, 16 Drawing Sheets

(51) Int. Cl.
*H02M 7/217* (2006.01)
*H02J 7/02* (2016.01)

(58) Field of Classification Search
USPC .......................................................... 307/104
See application file for complete search history.

(56) References Cited

U.S. PATENT DOCUMENTS

2014/0225447 A1   8/2014  Teggatz
2015/0001956 A1   1/2015  Saen et al.
2017/0070159 A1   3/2017  Boys et al.
2018/0090995 A1*  3/2018  Arasaki .................. H02J 50/12

FOREIGN PATENT DOCUMENTS

KR   10-2013-0139239 A   12/2013
WO   WO 2013/006068 A1   1/2013

\* cited by examiner (a)

(b)

WIRELESS POWER RECEIVER

CROSS REFERENCE TO RELATED APPLICATIONS

This application claims the benefit under 35 USC 119(a) of PCT Application No. PCT/KR2016/002560, filed on Mar. 15, 2016, which claims the benefit of Korean Patent Application No. 10-2015-0037661 filed Mar. 18, 2015, in the Korean Intellectual Property Office, the entire disclosure of which is incorporated herein by reference for all purposes.

TECHNICAL FIELD

Disclosed is a wireless power transmission and reception system, and more particularly, a wireless power receiving unit for receiving wireless power.

BACKGROUND ART

FIG. 1 is a block diagram of a power receiving unit of a conventional wireless power transmission system. Generally, a power receiving unit (PRU) has a structure as shown in FIG. 1. As well known, a resonator 10 is composed of an inductor L and a capacitor C, that is, an LC circuit, to receive wireless energy. In this case, an alternating current (AC) having the same frequency as that transmitted by a power transmission unit (PTU) flows through the resonator 10. Typically, a PRU converts received wireless energy into a stable DC signal as a final output to supply power to a load. Therefore, there is a need for a rectifier 20 as shown in FIG. 1. The rectifier 20 converts an AC signal into an unregulated DC signal. This signal is converted into a precise DC voltage Vout by means of a converter 30 and then supplied to a load. For reference, the converter 30 may be a buck-type converter, a boost-type converter, or a linear-type converter. Irrespective of the form of a converter, the converter has a two-stage structure as shown in FIG. 1. However, efficiency of a wireless power receiving unit is determined by multiplying efficiency of the rectifier 20 and efficiency of the converter 30. Accordingly, it may be difficult to satisfy high efficiency as the converter is configured to have multiple stages.

DETAILED DESCRIPTION OF THE INVENTION

Technical Problem

The present invention is directed to providing a wireless power receiving unit capable of guaranteeing high efficiency by using only a rectifier without need of a separate converter.

Technical Solution

A wireless power receiving unit according to an aspect includes a resonant tank configured to receive wireless power in a magnetic resonance manner, a rectifier configured to rectify the wireless power received by the resonant tank and supply the rectified current to a load, the rectifier including a diode bridge and a first switch connected across any one of diodes constituting the diode bridge, and a controller configured to control the first switch to enable the rectifier to operate as a full-wave rectifier or a half-wave rectifier.

According to an aspect, when the rectifier operates as a full-wave rectifier, a current flowing from the resonant tank is classified as a forward current returning to the resonant tank sequentially via a first diode and a fourth diode of the diode bridge and a reverse current returning to the resonant tank via a second diode and a third diode of the diode bridge, the first switch being connected across the fourth diode.

According to an aspect, the controller may detect an output voltage of the rectifier, compare the detected output voltage with a reference voltage, and control the first switch to be turned on or off according to a result of the comparison.

According to an aspect, the wireless power receiving unit may further include a bypass capacitor configured to prevent some current from being supplied from the resonant tank to the rectifier.

According to an aspect, the rectifier may further include a bypass capacitor configured to prevent some current from being supplied from the resonant tank to the load.

According to an aspect, the rectifier may further include a second switch connected to the bypass capacitor and configured to bypass some current supplied from the resonant tank to the load by the control of the controller.

According to an aspect, the controller may control the first switch and the second switch on the basis of a predetermined reference voltage and the output voltage of the rectifier, respectively.

According to an aspect, the controller may include a first comparison controller configured to compare a first generated voltage generated by detecting the output voltage of the rectifier at a first node of a plurality of resistors connected in series with a reference voltage and control the first switch and a second comparison controller configured to compare a second generated voltage generated by detecting the output voltage of the rectifier at a second node of the plurality of resistors connected in series with the reference voltage and control the second switch. Here, the first generated voltage may be higher than the second generated voltage.

According to an aspect, the controller may include a variable reference voltage generator configured to generate a variable reference voltage such that a voltage generated by detecting the output voltage of the rectifier is equal to a predetermined reference voltage, a first comparison controller configured to compare a first generated voltage generated by detecting the output voltage of the rectifier at a first node of a plurality of resistors connected in series with the variable reference voltage and control the first switch, and a second comparison controller configured to compare a second generated voltage generated by detecting the output voltage of the rectifier at a second node of the plurality of resistors connected in series with the variable reference voltage and control the second switch. Here, the first generated voltage may be higher than the second generated voltage.

Advantageous Effects of the Invention

The wireless power receiving unit according to the present invention generates a stable output voltage by means of a self-regulation rectifier. The wireless power receiving unit does not need to be configured as a multi-staged structure, thereby preventing an increase in the number of components and also increasing efficiency.

Also, the self-regulation rectifier of the wireless power receiving unit according to the present invention is automatically switched to a full-wave rectifier or a half-wave rectifier, thereby minimizing unnecessary losses.

MODE OF THE INVENTION

The above and other aspects of the present invention will be more apparent through exemplary embodiments described with reference to the accompanying drawings. Hereinafter, the present invention will be described in detail so that those skilled in the art can readily understand and reproduce the present invention through the embodiments.

Figure 2:
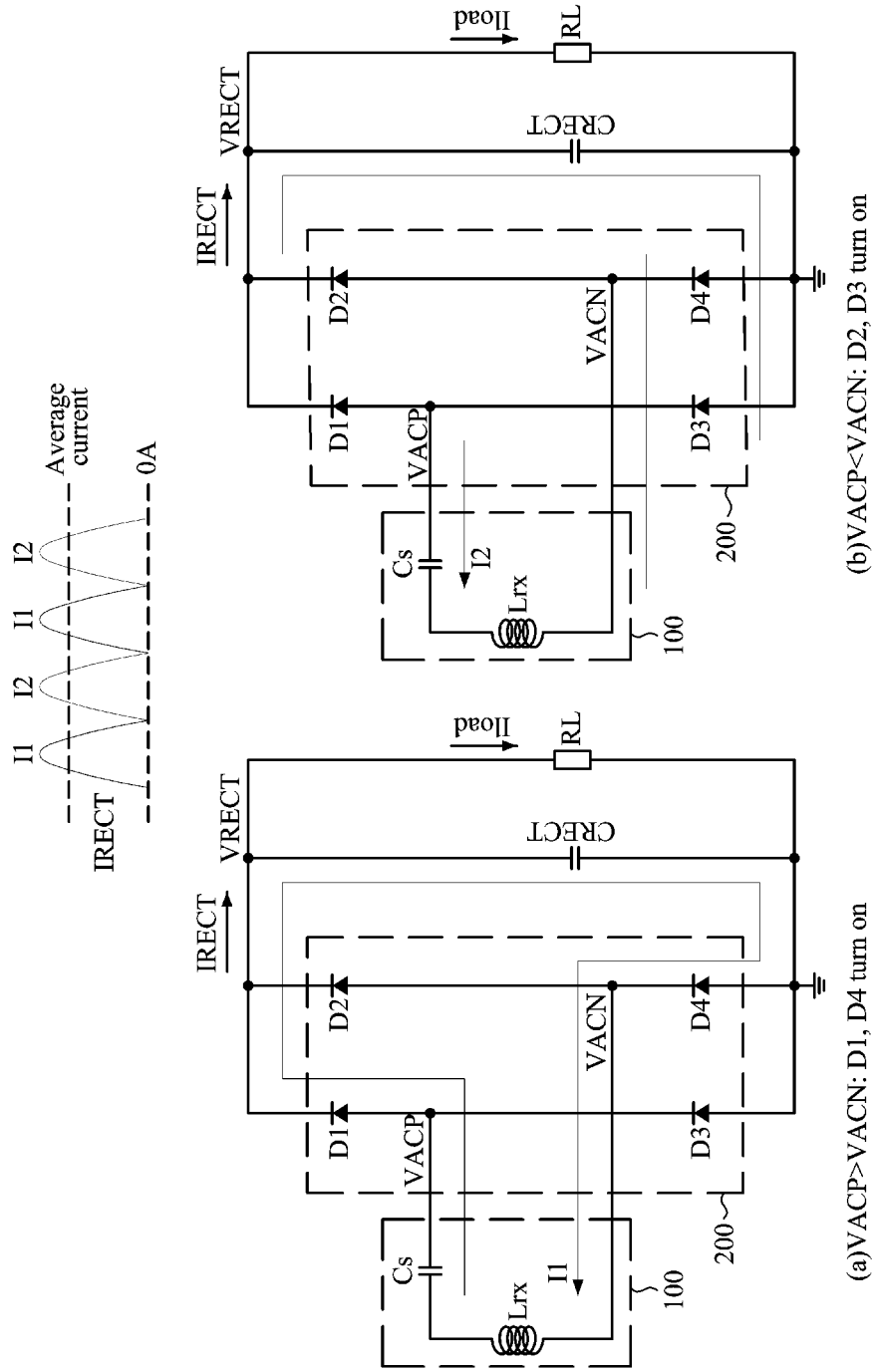
FIG. 2 is a circuit diagram of a wireless power receiving unit using a full-wave rectifier.

FIG. 2 is a circuit diagram of a wireless power receiving unit using a full-wave rectifier. FIG. 2A and FIG. 2B show circuits of a wireless power receiving unit using a general full-wave rectifier. Lrx and Cs constitute a resonator for receiving wireless power in a magnetic resonance manner, that is, a resonant tank 100. Lrx represents an equivalent inductor of a wireless power reception antenna. When power is supplied through Lrx in a wireless manner and an input voltage VACP of a rectifier 200 composed as a diode bridge is greater than VACN, a first diode D1 and a fourth diode D4 are turned on and thus an operation shown in FIG. 2A is performed. A flow direction shown in FIG. 2A is called a forward direction. Conversely, when VACN>VACP, a second diode D2 and a third diode D3 are turned on and thus an operation shown in FIG. 2B is performed. A flow direction shown in FIG. 2B is called a reverse direction. When a current supplied by Lrx has the form of a sine wave, a full-wave rectified current IRECT is supplied to a load RL and a capacitor CRECT, as shown in FIG. 2.

Figure 1:
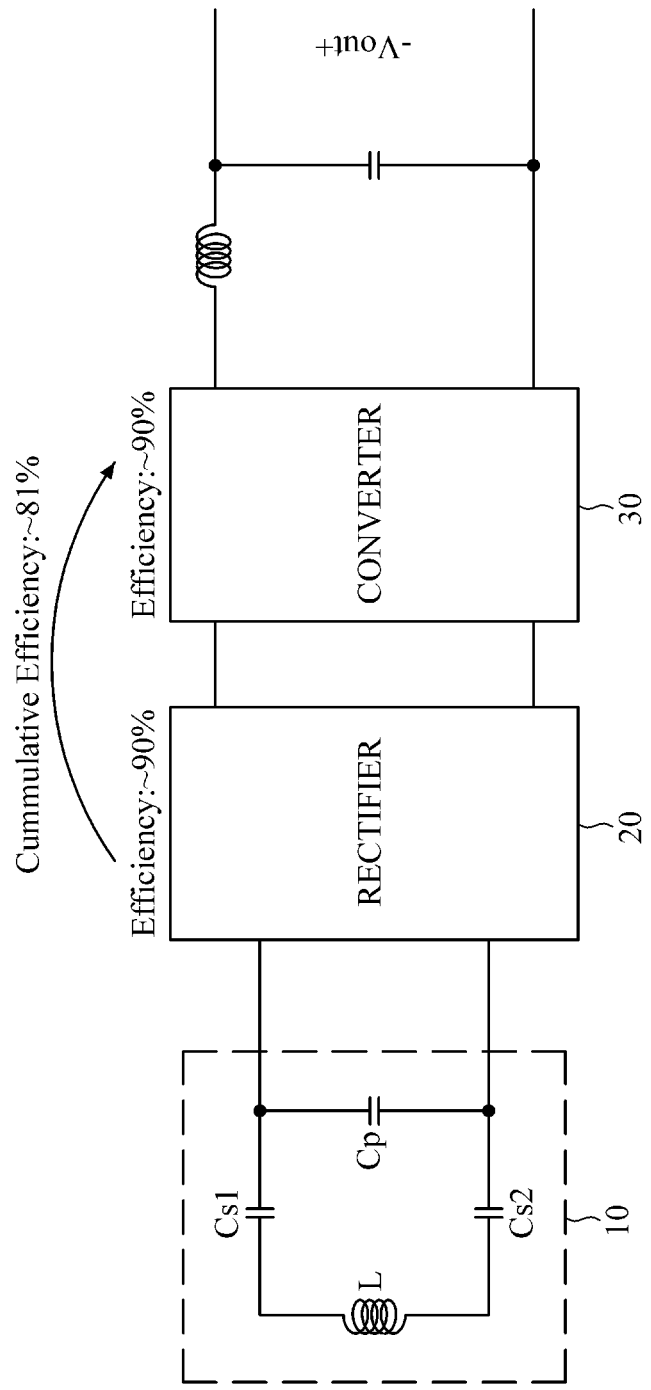
FIG. 1 is a diagram showing a structure of a conventional wireless power receiving unit.
Figure 3:
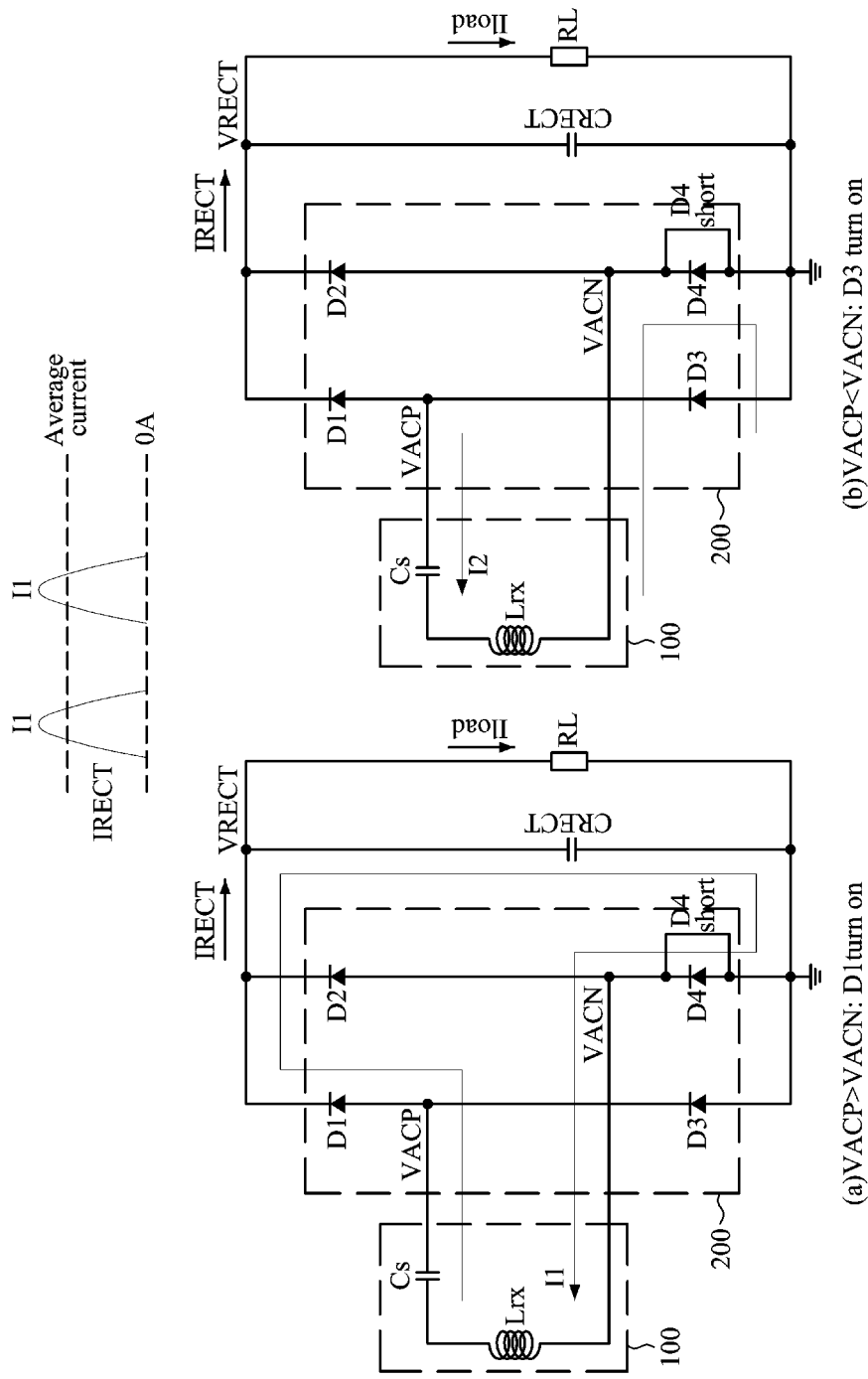
FIG. 3 is a circuit diagram of a wireless power receiving unit using a half-wave rectifier.

FIG. 3 is a circuit diagram of a wireless power receiving unit using a half-wave rectifier. When D4 is short-circuited in the circuit of FIG. 2, as shown in FIG. 3A, the rectifier 200 operates as a half-wave rectifier. When VACN>VACP, a current is not supplied to a load but returns to a resonant tank 100 through D3 because D4 is short-circuited. Accordingly, since IRECT has a half-wave rectified waveform, an average current supplied to the load is lower than that shown in FIG. 1.

Figure 4:
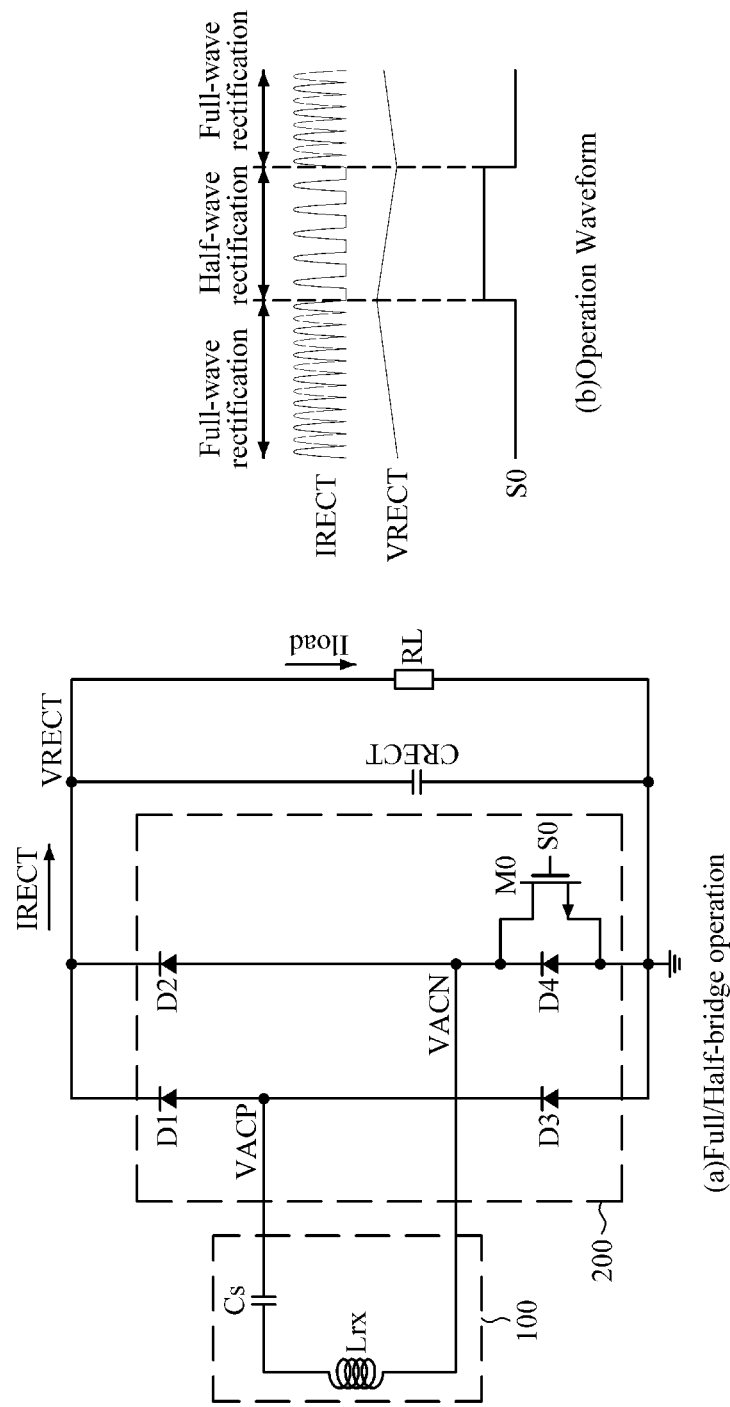
FIG. 4 shows a circuit diagram and an operating waveform of a wireless power receiving unit according to an embodiment.

FIG. 4 shows a circuit diagram and an operating waveform of a wireless power receiving unit according to an embodiment. The above-described operations of the full-wave rectifier and the half-wave rectifier may be performed by additionally including a first switch M0 as shown in FIG. 4A. As shown in FIG. 4, the wireless power receiving unit includes a resonant tank 100 and a rectifier 200. In FIG. 4, the resonant tank 100 is composed of one inductor and one capacitor. Alternatively, the resonant tank 100 may be composed of two or more inductors and/or two or more capacitors. The rectifier 200 rectifies power received in a wireless manner from the resonant tank 100 for supply to a load. The rectifier 200 according to an aspect includes a diode bridge and a first switch M0. The diode bridge is composed of D1, D2, D3, and D4, and the first switch M0 is connected across any one of the diodes constituting the diode bridge.

When the rectifier 200 operates as a full-wave rectifier, a current input from the resonant tank 100 returns to the resonant tank 100 sequentially via D1 and D4 or via D2 and D3. The former may be called a forward current, and the latter may be called a reverse current. Also, the first switch M0 is connected across D4. This is to enable the rectifier 200 to operate as both a full-wave rectifier and a half-wave rectifier. The first switch M0 may be a MOSFET switch. The rectifier 200 is switched to a half-wave rectification circuit when M0 is turned on and is switched to a full-wave rectification circuit when M0 is turned off. As described above, when the rectifier 200 is switched to a half-wave rectification circuit, a current IRECT supplied to a load is reduced by half, and thus a voltage VRECT, which is an output voltage of the rectifier 200 and is applied to the load, decreases. Conversely, when the rectifier 200 is switched to a full-wave rectification circuit, the voltage VRECT increases. Since the current supplied to the load may be controlled by driving M0, the output voltage VRECT may be controlled as shown in FIG. 4B.

Figure 5:
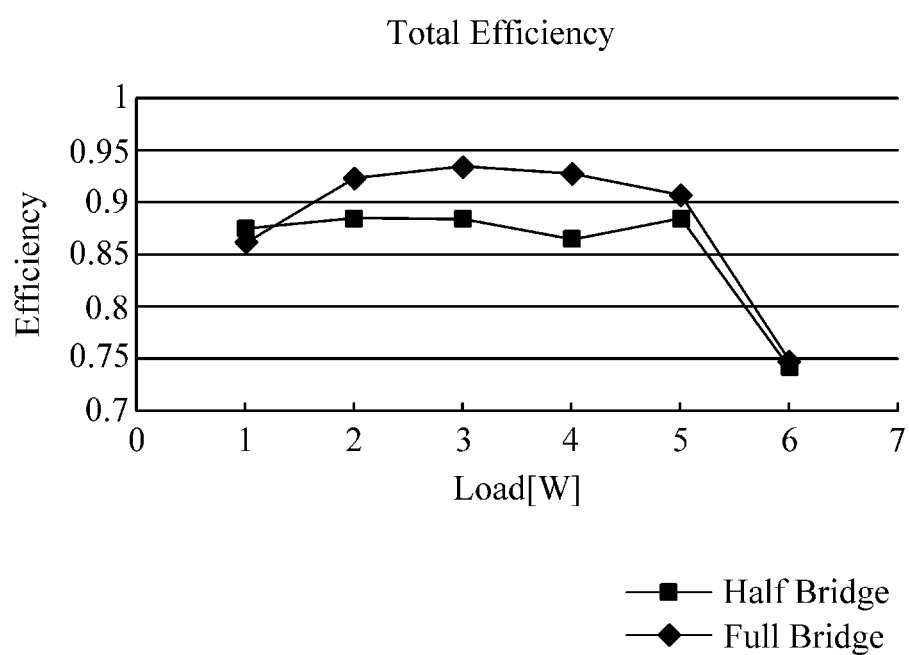
FIG. 5 is an efficiency graph of a full-wave rectifier and a half-wave rectifier that are produced using a Schottky diode.

In particular, when a load current Iload is high, the rectifier 200 operates as a full-wave rectifier or a half-wave rectifier. An efficiency graph of the full-wave rectifier and the half-wave rectifier is as shown in FIG. 5. FIG. 5 shows a result of implementing a circuit for rectifying a 6.78 MHz AC input by means of a Schottky diode device and measuring efficiency of a rectifier while changing power supplied to a load. When the same power is supplied to a load, the full-wave rectifier supplies power to the load under both conditions VACP>VACN and VACP<VACN. Accordingly, the circuit may have a smaller current peak and thus better efficiency when operating as the full-wave rectifier than when operating as the half-wave rectifier. However, when the circuit operates as the half-wave rectifier, the efficiency of the circuit is low but not too low. Accordingly, when the rectifier 200 shown in FIG. 4A operates alternately as the full-wave rectifier and the half-wave rectifier in order to control the output voltage, the efficiency of the rectifier 200 may be determined in the range of the efficiency of the full-wave rectifier and the efficiency of the half-wave rectifier. As seen from FIG. 5, a high efficiency of about 90% may be expected 5 W or less. However, when the current required by the load is very small, the rectifier 200 may operate only as the half-wave rectifier. In this case, when a current supplied by the half-wave rectifier is higher than a voltage required by the load, an output voltage VRECT of the rectifier 200 will increase, and thus the VRECT may not be controlled. In order to handle such a situation, some current of the resonant tank 100 may be bypassed to the ground through a capacitor.

Figure 6:
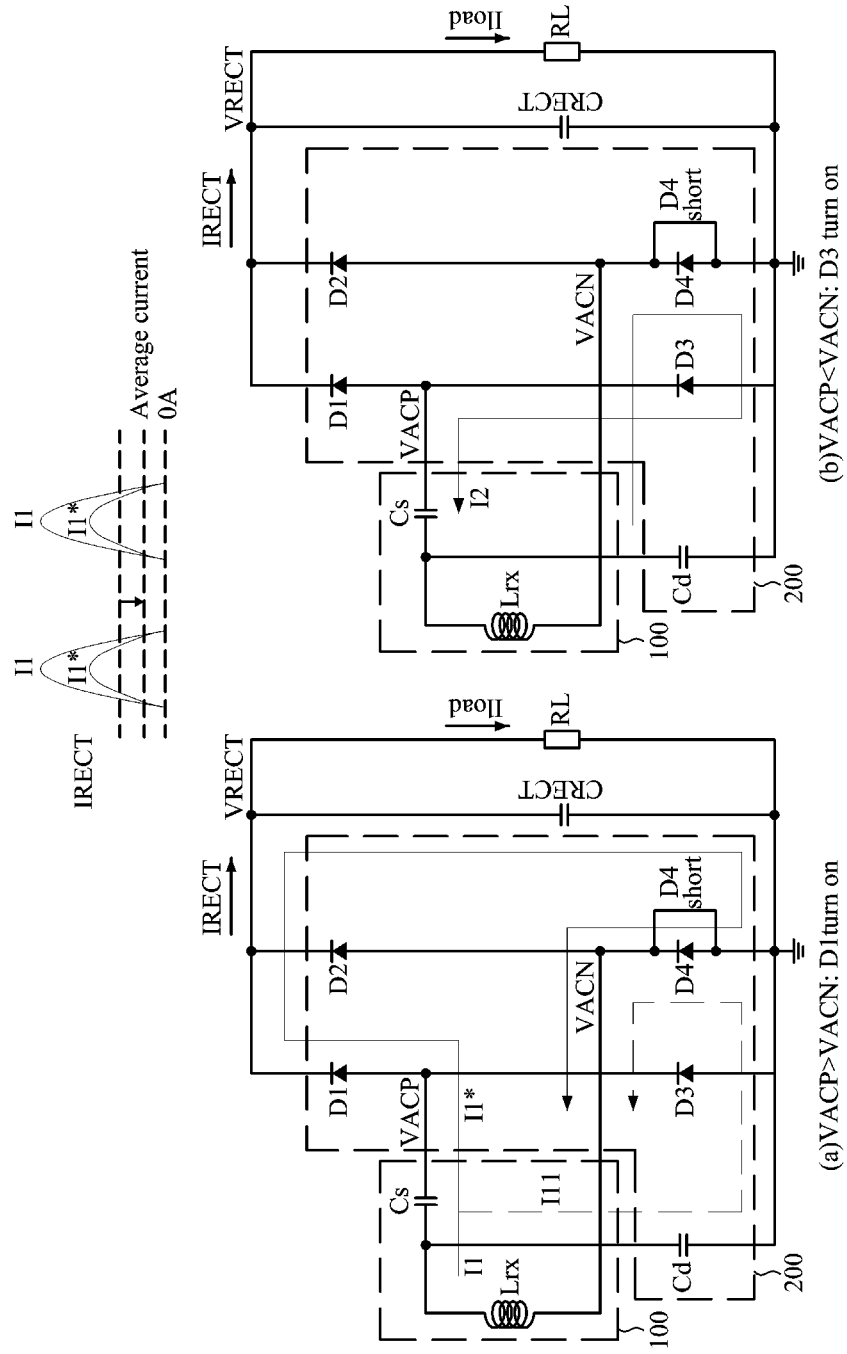
FIG. 6 is a diagram showing a circuit to which a bypass capacitor is additionally included according to an embodiment.

FIG. 6 is a diagram showing a circuit to which a bypass capacitor is additionally included according to an embodiment. In FIG. 6, a bypass capacitor Cd is connected between Lrx and Cs toward the ground. When a current I1 is supplied by Lrx, a current I11 passes out through Cd, and thus I1*, which is I1 minus I11 is supplied to a load. The circuit of FIG. 6 operates a half-wave rectifier. Accordingly, I1* is supplied to the load only when VACP>VACN as shown in FIG. 6A, and power is not supplied to the load when VACN>VACP as shown in FIG. 6B. That is, the circuit fundamentally operates as the half-wave rectifier, but some current is not supplied to the load. Accordingly, the circuit supplies smaller power to the load than the half-wave rectifier. Accordingly, a voltage VRECT, which may be lowered only by the operation of the half-wave rectifier, may be further lowered by means of Cd. On the other hand, as shown in FIG. 7, an operation similar to that described above may be performed when Cd is connected to the other side of Cs.

Figure 8:
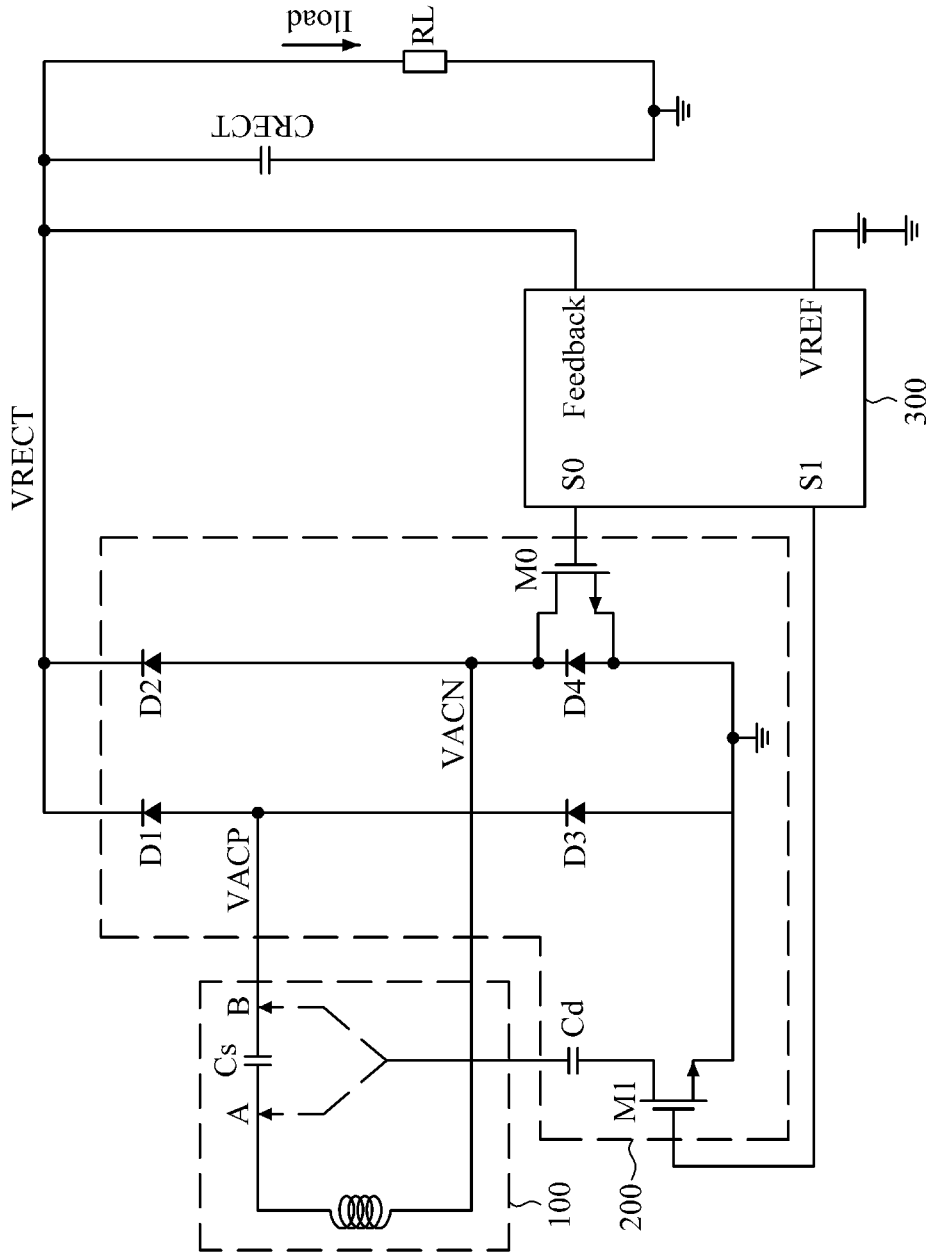
FIG. 8 is a diagram showing a circuit of a wireless power receiving unit including a self-regulation rectifier according to an embodiment.

FIG. 8 is a diagram showing a circuit of a wireless power receiving unit including a self-regulation rectifier according to an embodiment. A rectifier 200 includes a diode bridge composed of D1, D2, D3, and D4 and M0 connected across D4. In addition, the rectifier 200 may further include Cd. Furthermore, the rectifier 200 may further include a second switch M1 connected in series with Cd. M1 may also be a MOSFET switch. A controller 300 controls M0 to be turned on or off. When M1 is present, the controller 300 controls M1 to be turned on or off. In detail, the controller 300 functions to generate switching signals S0 and S1 of the switches M0 and M1 so that the voltage VRECT is proportional to a predetermined reference voltage VREF. Obviously, the controller 300 generates the switching signal S0 for controlling only M0 when M1 is not implemented in the circuit. Since the circuit shown in FIG. 8 controls the output voltage VRECT without a separate converter, the rectifier 200 may be named a self-regulation rectifier (SRR).

Figure 7:
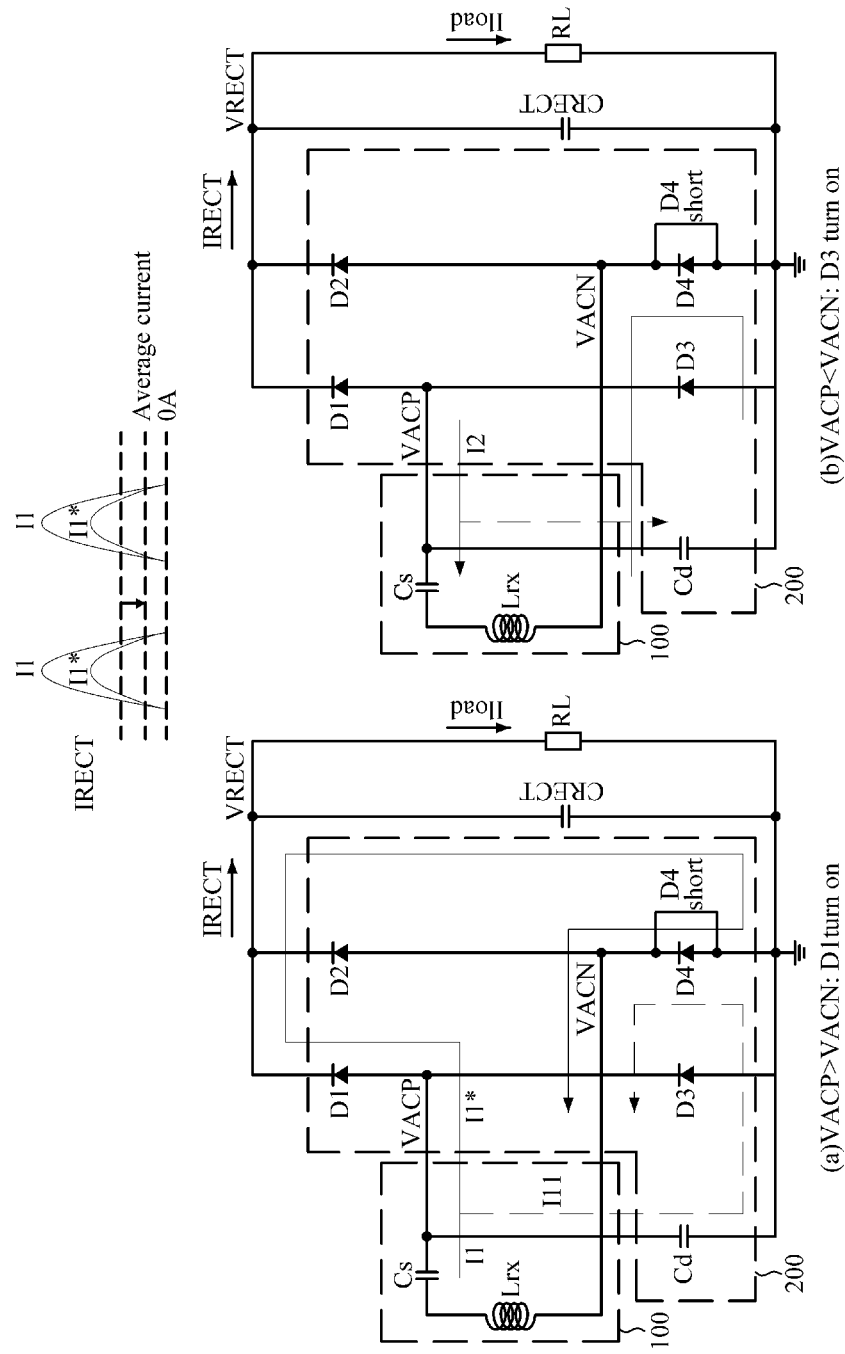
FIG. 7 is a diagram showing a circuit to which a bypass capacitor is additionally included according to another embodiment.

Also, Cd having a node connected in series with M1 may operate although a connection position of another node of Cd is changed as shown in FIGS. 6 and 7. Generally, the other node is connected to an inside of the resonant tank or to an input of the diode bridge. Since the resonant tank 100 is composed of Lrx and Cs in FIG. 8, connectable points are node A and node B. When a resonant tank is composed of several inductors and several capacitors, a node corresponding to A corresponds to a node in the resonant tank.

A basic operation of the controller 300 is to generate driving signals S0 and S1. Obviously, when M1 is not implemented in the circuit, the controller 300 generates only the driving signal S0. For convenience of description, the following description will be limited to a case in which both M0 and M1 are implemented in the circuit. However, embodiments of the present invention are not limited thereto. However, an operation when Cd is added in addition to M0 and further an operation when M1 is further added will be fully understood through the above description.

Figure 9:
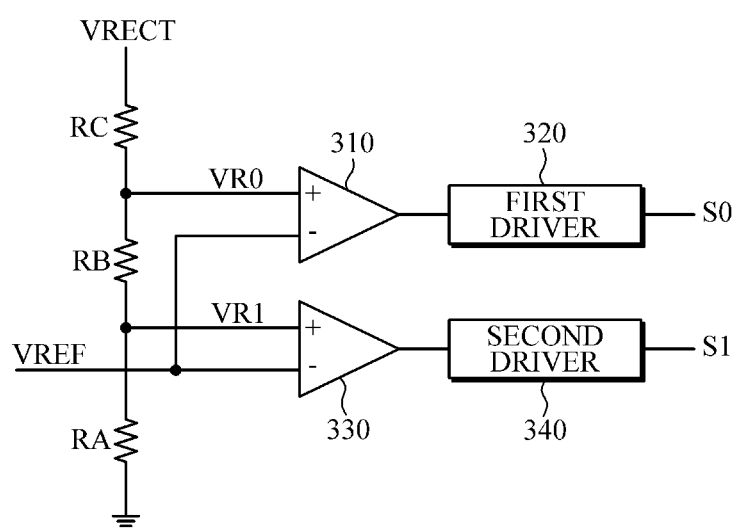
FIG. 9 is a diagram showing a VRECT voltage control circuit according to an embodiment.

The controller 300 controls M0 and M1 on the basis of the output voltage VRECT rectified by the rectifier 200 and the predetermined reference voltage VREF, respectively. According to an embodiment, the controller 300 may be implemented using two comparators as shown in FIG. 9. As shown in FIG. 9, the controller 300 includes a first comparison controller 300 and a second comparison controller 300. The first comparison controller 300 compares a first generated voltage generated by detecting the output voltage of the rectifier 200 at a first node of a plurality of resistors connected in series with a reference voltage and controls the first switch M0. To this end, the first comparison controller 300 includes a first comparator 310 and a first driver 320. Also, the second comparison controller 300 compares a second generated voltage generated by detecting the output voltage of the rectifier 200 at a second node of the plurality of resistors connected in series with the reference voltage and controls the second switch M1. To this end, the second comparison controller 300 includes a second comparator 330 and a second driver 340. Here, the first generated voltage is higher than the second generated voltage.

This will be described in detail with reference to FIG. 9. Resistors RA, RB, and RC connected in series are used to detect VRECT. Here, a node between RB and RC is a first node, and a node between RA and RB is a second node. A first generated voltage VR0 and a second generated voltage VR1, which are signals generated by detecting VRECT using RA, RB, and RC, satisfy a relation of VR0>VR1. When the voltage VR0 generated by detecting VRECT becomes larger than VREF, an output of the first comparator 310 becomes high, and the first driver 320 generates a signal S0 for driving M0. In FIG. 9, each of the first driver 320 and the second driver 340 is a circuit having a current driving capability sufficient to facilitate driving of a switch and has an input and output having the same phase. Accordingly, when a comparator output is high, a driver output is also high. Thus, the rectifier 200 lowers VRECT by operating as a half-wave rectifier. Although the VRECT is lowered, VRECT may increase until VR1 is higher than VREF. In this case, both the output of the first comparator 310 and an output of the second comparator 330 are high and thus S0 and S1 are high.

However, when the output of the first comparator 310 is alternately high and low, the rectifier 200 operates alternately as a full-wave rectifier and a half-wave rectifier to control VRECT. Since the first comparator 310 responds depending on whether VR0 is higher or lower than VREF, it can be seen that control is performed in a steady-state such that VR0=VREF. Accordingly, this satisfies Equation 1 below:

$$VR0 = \frac{RA + RB}{RA + RB + RC} VRECT = VREF. \quad \text{[Equation 1]}$$

Accordingly, the voltage VRECT is determined as Equation 2 below:

$$VRECT = \left(\frac{RA + RB + RC}{RA + RB}\right) VREF. \quad \text{[Equation 2]}$$

However, when the output of the second comparator 330 is controlled to be alternately high and low, the voltage VRECT is defined as Equation 3 below:

$$VRECT = \left(\frac{RA + RB + RC}{RA}\right) VREF. \quad \text{[Equation 3]}$$

Figure 10:
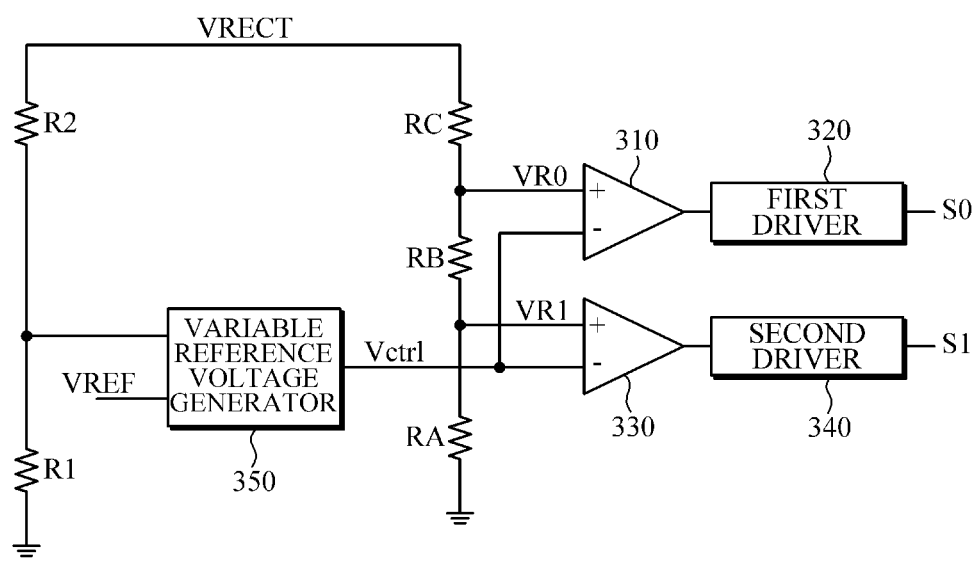
FIG. 10 is a diagram showing a VRECT voltage control circuit using a variable reference voltage generator according to an embodiment.

Since VRECT of Equation 3 is higher than VRECT of Equation 2, it can be seen that VRECT is controlled to be higher in Equation 3 than in Equation 2. That is, this means that VRECT may be controlled slightly differently depending on which comparator operates. When a voltage VREF in Equation 3 decreases below a voltage VREF in Equation 2, VRECT in Equation 3 is the same as that in Equation 2. This means that VRECT may be controlled to almost the same voltage in any case by slightly varying VREF. Accordingly, a variable reference voltage generator may be additionally included as shown in FIG. 10.

A variable reference voltage generator 350 generates a variable reference voltage such that a voltage generated by detecting VRECT is equal to VREF. As shown in FIG. 10, the variable reference voltage generator generates a Vctrl signal, which is a variable reference voltage, such that a value obtained by detecting VRECT by means of a first resistor R1 and a second resistor R2 connected in series is equal to VREF. Thus, the first comparator 310 compares VR0 and Vctrl, and the second comparator 330 compares VR1 and Vctrl.

The variable reference voltage generator 350 may be implemented as shown in FIGS. 11A and 11B. FIG. 11A shows an example of the variable reference voltage generator 350 composed of an operational amplifier (an op amp) and a capacitor Cs using negative feedback. VF is a voltage obtained by detecting VRECT by means of R1 and R2. When VF>VREF, a current flows through a resistor R to charge Cc, and thus Vctrl decreases. Otherwise, Vctrl increases. Since VREF=VF when the control is completed, the voltage VRECT is determined as Equation 4 below:

$$VRECT = \left(1 + \frac{R2}{R1}\right)VREF. \quad \text{[Equation 4]}$$

Figure 11:
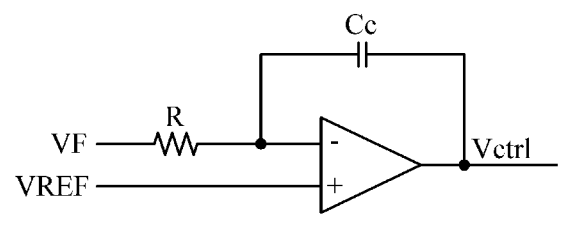
FIG. 11 is a diagram illustrating the variable reference voltage generator shown in FIG. 10.
Figure 11:
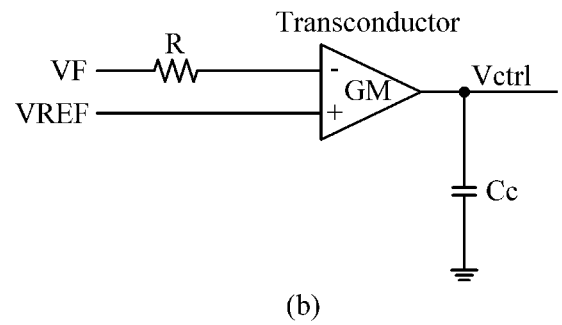

FIG. 11B shows an example of the variable reference voltage generator 350 composed of a transconductor amplifier and a capacitor Cc. The transconductor amplifier detects the voltage VRECT by means of R1 and R2, compares the detected voltage VRECT with VREF, and charges Cc with a current obtained by multiplying a difference obtained through the comparison by transconductance GM or discharges Cc. Accordingly, the variable reference voltage generator 350 may operate identically to that shown in FIG. 11A by controlling Vctrl. The variable reference voltage generator may be implemented in various ways other than that shown in FIG. 11.

Figure 12:
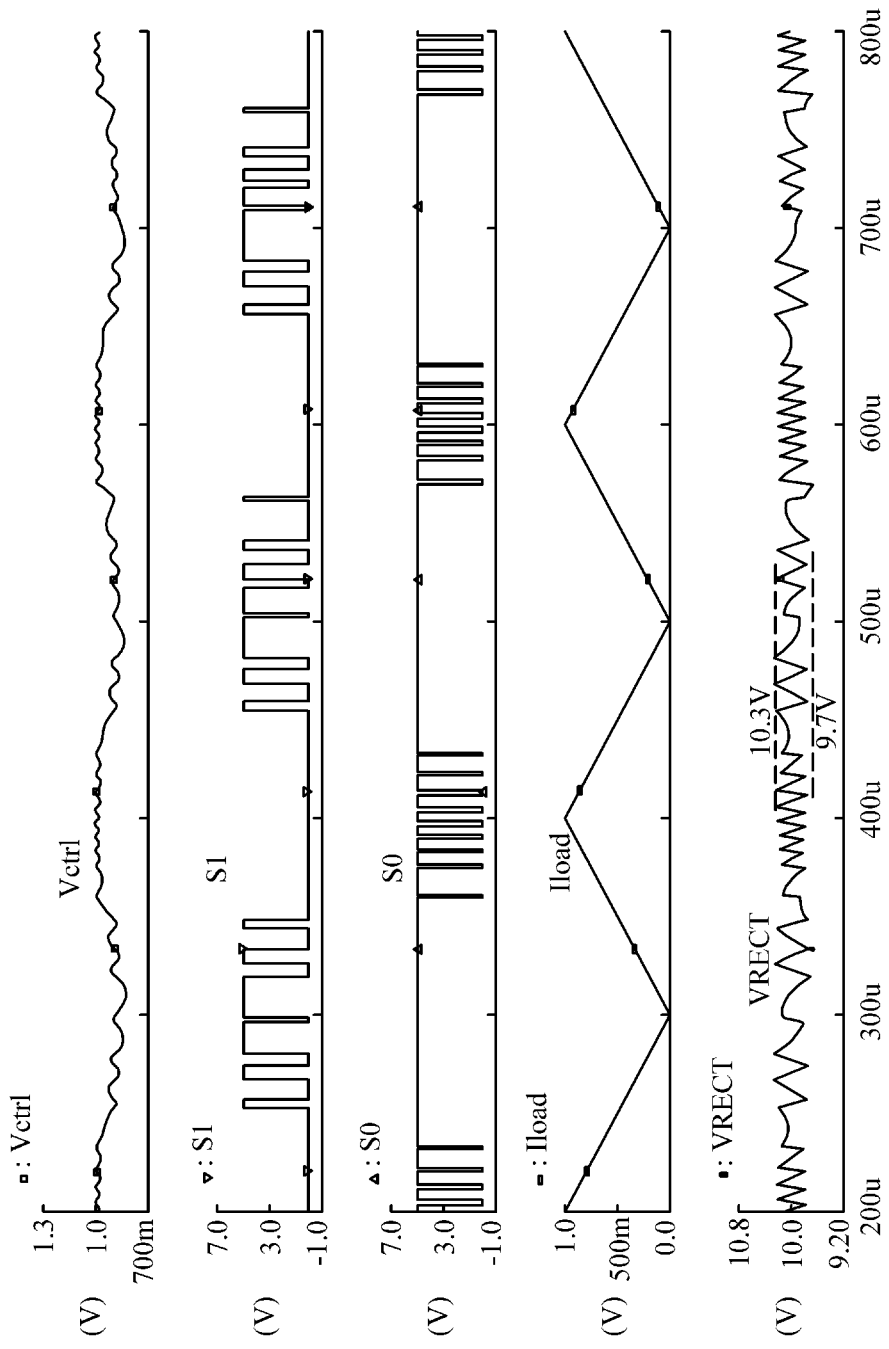
FIG. 12 is a result graph of a VRECT voltage variation simulation experiment using the circuit of FIG. 8.

A simulation experiment result according to the above-described technical configuration is shown in FIG. 12. A load current is varied in the range of 0 to 1 A, and R1, R2, and VREF are set such that VRECT is 10V. As seen from FIG. 12, VRECT was about 10V, and thus a situation in which power of 0 to 10 W is supplied to a load was simulated for the experiment. The simulation experiment was performed while a resonance frequency of a resonant tank was set to 6.78 MHz. When the current is high, S0 becomes high or low to control the output voltage. When the current is low, the switches M0 and M1 are turned on to perform the control. In this case, Vctrl, which is a comparator reference voltage, changes actively as shown in FIG. 12. Thus, the voltage VRECT, which ranges between 9.7V and 10.3V, is controlled with an error of +/−300 mV although the load current is varied between 0 A and 1 A.

Figure 13:
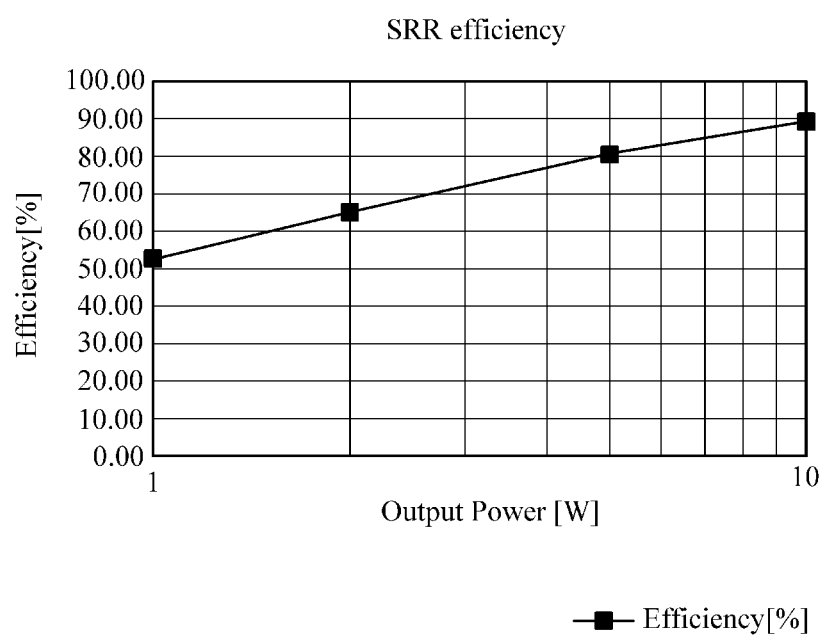
FIG. 13 is an efficiency graph of a self-regulation rectifier according to the simulation experiment result.

FIG. 13 is an efficiency graph of an SRR when Iload is changed between 0.1 A and 1 A and VRECT is controlled to 10V. In this case, a current supplied by TX is set to sufficiently generate an output of 1 A. It can be seen that the SRR operates with high efficiency, which approximately reaches 90%, near 10 W.

Figure 14:
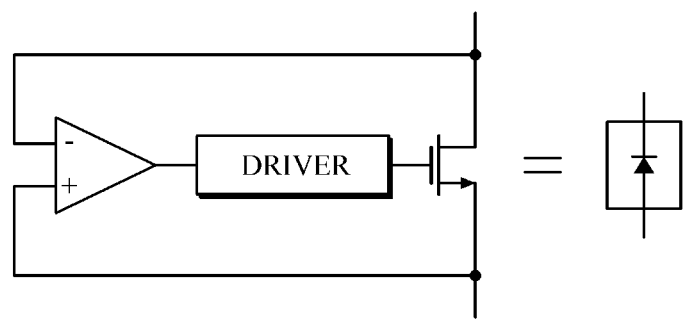
FIG. 14 is an example diagram of an active diode.

FIG. 14 is an example diagram of an active diode. The diode bridge shown in FIG. 8 may be implemented by means of an active diode as shown in FIG. 14. The active diode uses a switching element such as a MOSFET. When a switch is turned on, a voltage across the switch may be set lower than a diode conduction voltage, and thus it is possible to reduce conduction losses. Accordingly, it is possible to use an active diode in order to improve rectifier efficiency. A comparator for detecting a source voltage becoming higher than a drain voltage turns on and switches the MOSFET to a conductive state when the source voltage becomes higher than the drain voltage, and turns off the MOSFET otherwise. A method of comparing a drain voltage and a source voltage may be implemented in various forms.

Figure 15:
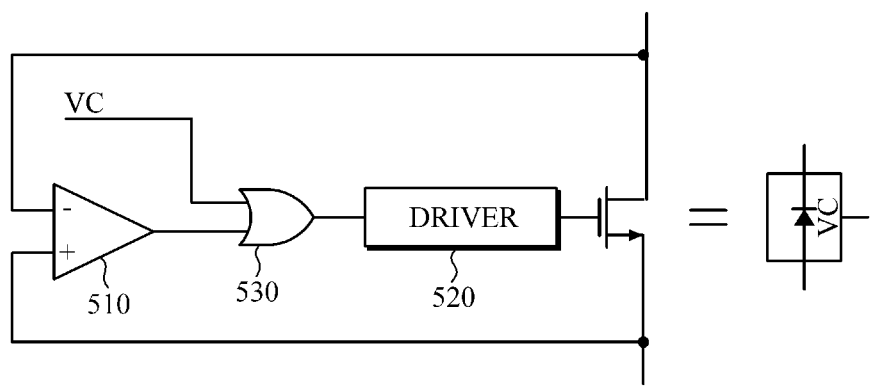
FIG. 15 is a diagram showing an active diode for replacing D4 according to an embodiment.
Figure 16:
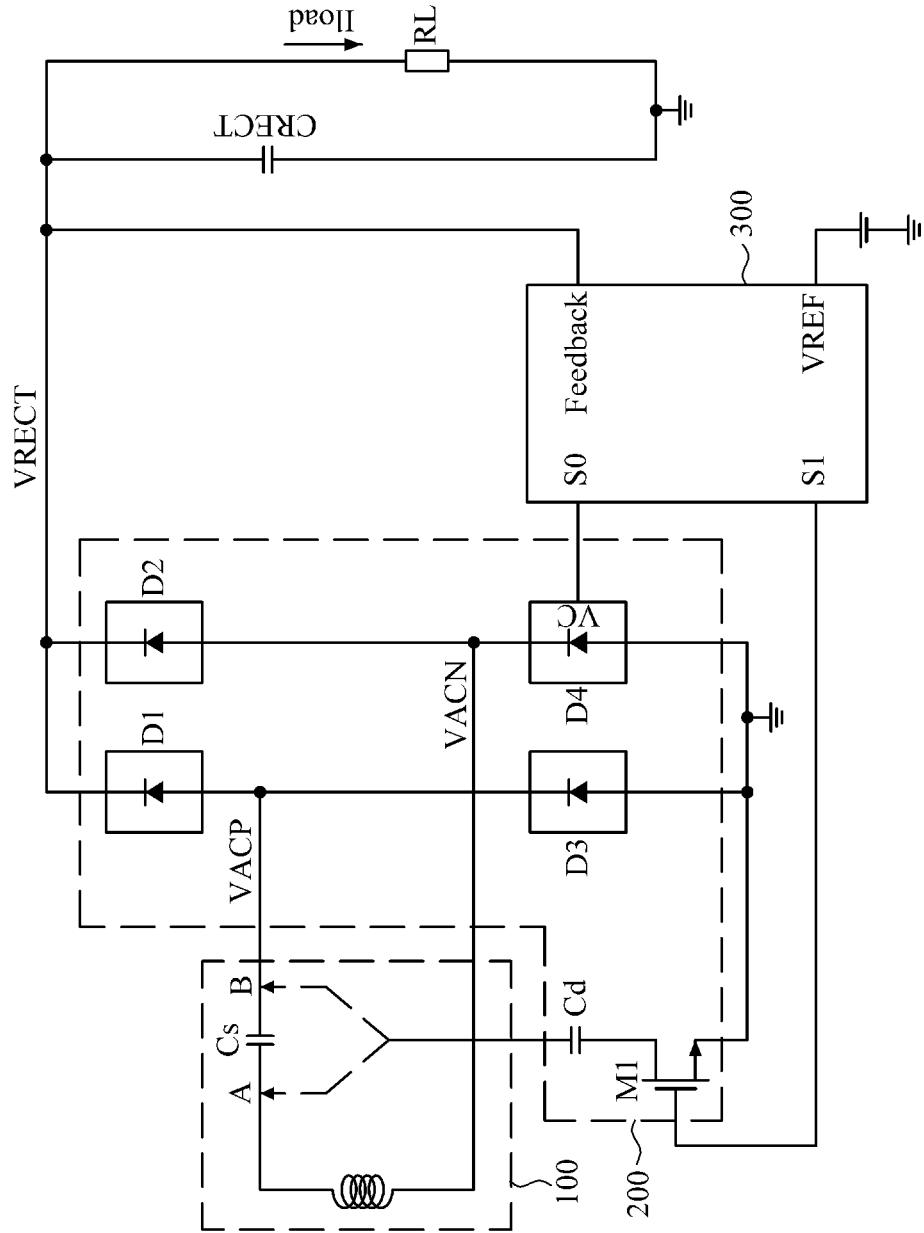
FIG. 16 is a diagram showing a circuit of a wireless power receiving unit including a self-regulation rectifier using an active diode according to an embodiment.

FIG. 15 is a diagram showing an active diode for replacing D4 according to an embodiment. The active diode further includes a logic element 530 in addition to a comparator 510 and a driver 520. The comparator 510 compares a source voltage and a drain voltage. According to an embodiment, the comparator 510 outputs a high signal when the source voltage is higher than the drain voltage, and outputs a low signal otherwise. Also, the logic element 530 may be an OR element and receives a control signal VC and an output of the comparator 510 and outputs a high or low signal. In FIG. 15, when VC becomes high, the MOSFET may be turned on regardless of the output of the comparator 510. An SRR formed using this configuration is illustrated in FIG. 16.

An n-type MOSFET is shown as the switch included in the active diode in FIGS. 14 and 15 is shown, but this is merely an example. For example, a switching element such as a bipolar transistor, an insulated gate transistor (IGBT), a GaN transistor, a SiC transistor, etc. may be used to construct a circuit having the same concept. Also, a typical diode may be used as at least one of D1, D2, and D3 of FIG. 16.

So far, the present invention has been described with reference to preferred embodiments thereof. It will be understood by those skilled in the art that various changes in form and details may be made therein without departing from the spirit and scope of the present invention. Therefore, the disclosed embodiments should be considered in descriptive sense only and not for purposes of limitation. Also, the scope of the present invention is defined not by the detailed description of embodiments but by the appended claims, and all differences within the scope will be construed as being included in the present invention.

The invention claimed is:

1. A wireless power receiving unit comprising:
a resonant tank configured to receive wireless power in a magnetic resonance manner; and
a rectifier configured to rectify the wireless power received by the resonant tank and supply a rectified current to a load, the rectifier comprising a diode bridge, a first switch connected across any one of diodes constituting the diode bridge, a bypass capacitor configured to prevent some current from being supplied from the resonant tank to the load, and a second switch connected to the bypass capacitor and configured to bypass some current supplied from the resonant tank to the load by the control of a controller;

wherein the controller is configured to control the first switch and the second switch based on a predetermined reference voltage and the output voltage of the rectifier, respectively.

2. The wireless power receiving unit of claim 1, wherein when the rectifier operates as a full-wave rectifier, a current flowing from the resonant tank is classified as a forward current returning to the resonant tank sequentially via a first diode and a fourth diode of the diode bridge and a reverse current returning to the resonant tank via a second diode and a third diode of the diode bridge, wherein the first switch being connected across the fourth diode.

3. The wireless power receiving unit of claim 1, wherein the controller comprises:

a first comparison controller configured to compare a first generated voltage generated by detecting the output voltage of the rectifier at a first node of a plurality of resistors connected in series with a reference voltage and control the first switch; and a second comparison controller configured to compare a second generated voltage generated by detecting the output voltage of the rectifier at a second node of the plurality of resistors connected in series with the reference voltage and control the second switch, wherein the first generated voltage is higher than the second generated voltage.

4. The wireless power receiving unit of claim 1, wherein the controller comprises:

a variable reference voltage generator configured to generate a variable reference voltage such that a voltage generated by detecting the output voltage of the rectifier is equal to a predetermined reference voltage;

a first comparison controller configured to compare a first generated voltage generated by detecting the output voltage of the rectifier at a first node of a plurality of series-connected resistors with the variable reference voltage and control the first switch; and a second comparison controller configured to compare a second generated voltage generated by detecting the output voltage of the rectifier at a second node of the plurality of series-connected resistors with the variable reference voltage and control the second switch, wherein the first generated voltage is higher than the second generated voltage.

* * * * *